Nov. 16, 1965  W. STELZER  3,217,494
BRAKE PRESSURE PROPORTIONING DEVICE
Filed Nov. 28, 1962  2 Sheets-Sheet 1
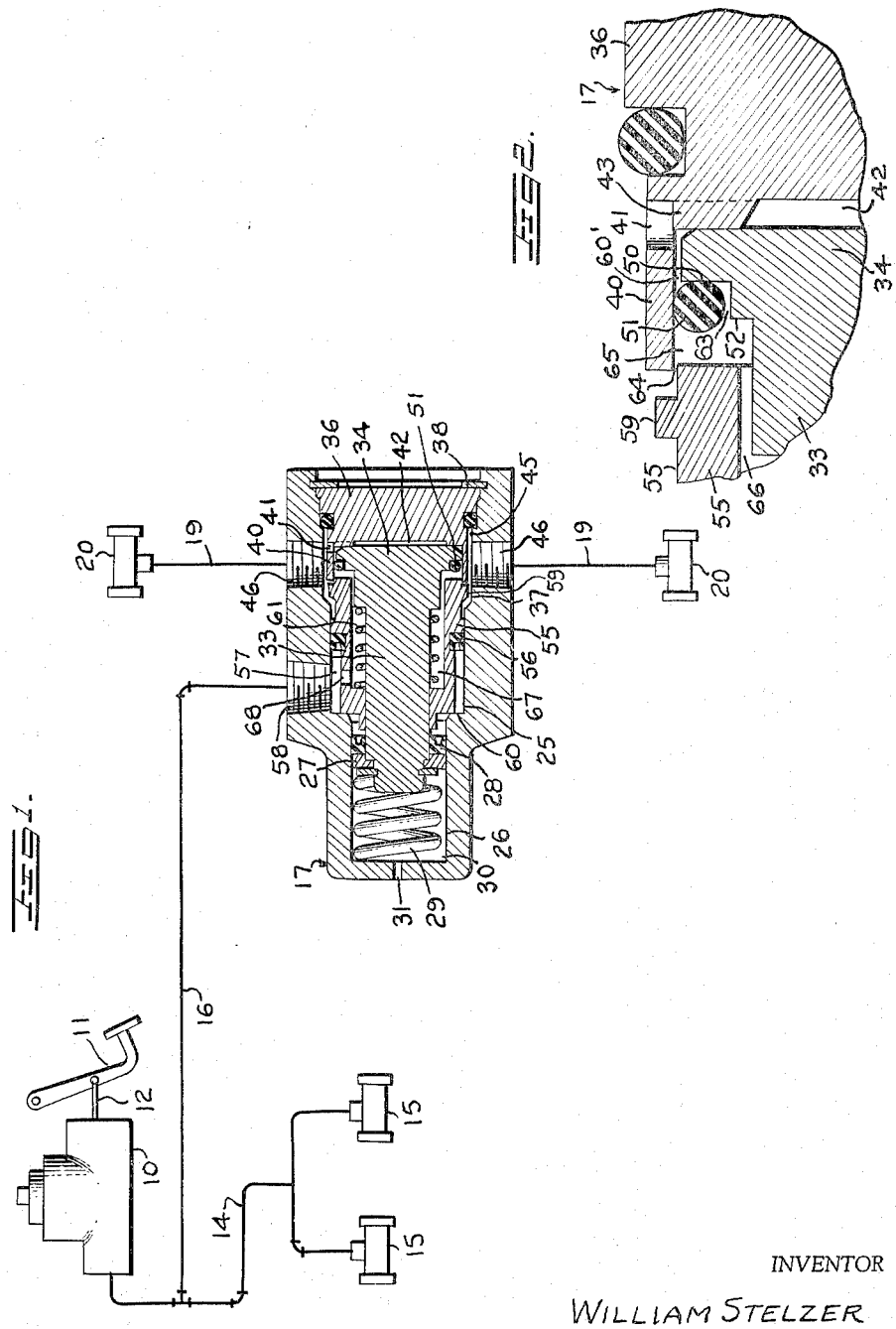
INVENTOR
WILLIAM STELZER
BY John F. Phillips
ATTORNEY

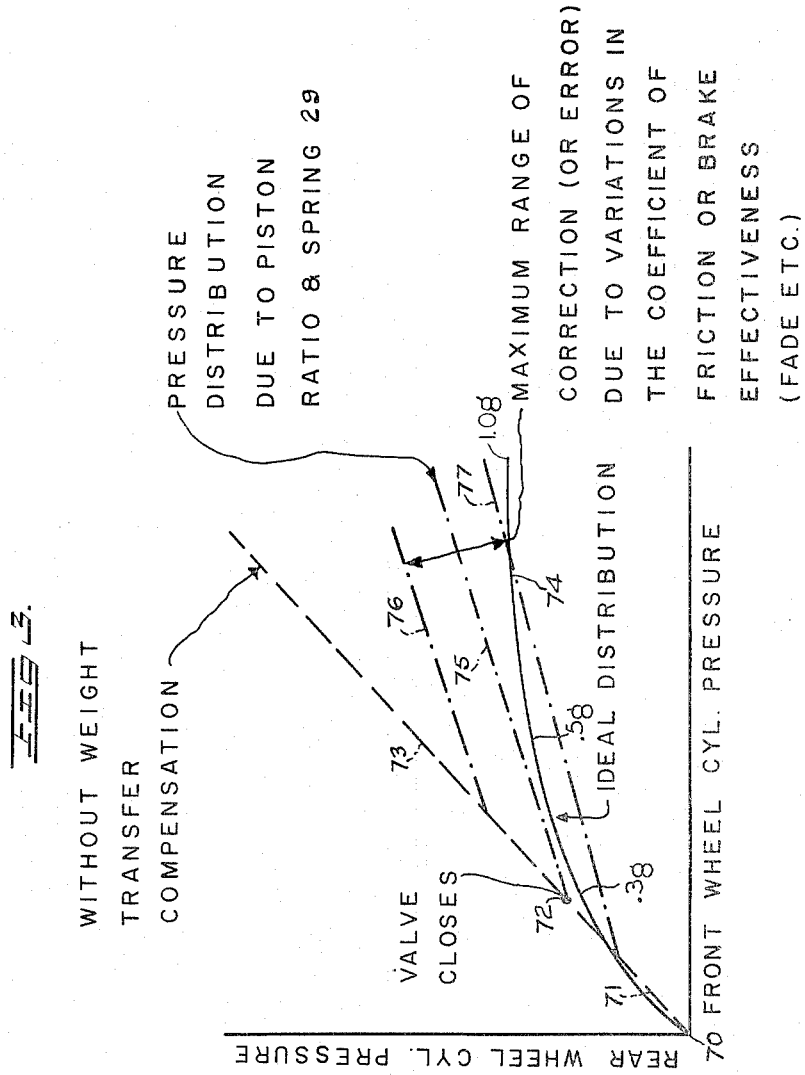

United States Patent Office 3,217,494
Patented Nov. 16, 1965

3,217,494
BRAKE PRESSURE PROPORTIONING DEVICE
William Stelzer, Bloomfield Hills, Mich., assignor to Kelsey-Hayes Company, Romulus, Mich., a corporation of Delaware
Filed Nov. 28, 1962, Ser. No. 240,531
9 Claims. (Cl. 60—54.5)

This invention relates to a vehicle brake mechanism and has particular reference to a weight-transfer compensating valve for relatively reducing braking pressures to the rear wheel cylinders.

It is well known that in conventional vehicle hydraulic brake systems, equal hydraulic pressures are delivered to the front and rear wheel cylinders upon operation of the pressure generating means, whether such means be a conventional pedal-operated master cylinder or a booster brake mechanism, or power-operated means. Thus, in a substantial brake application, over-braking of the rear wheels occurs causing the locking and sliding of the rear wheels. This condition is greatly aggravated by the fact that there is substantial vehicle body weight transfer during such brake applications, resulting in a reduction in weight supported by the rear wheels.

An important object of the present invention is to provide a simple and fool-proof device for limiting, beyond a certain point, the supplying of pressure to the rear wheel cylinders relative to pressure in the front wheel cylinders, to secure at least a partial correction in the rear wheel pressure cylinders, to reduce the possibility of rear wheel skid.

A further object is to provide such a device which is responsive to hydraulic pressures, so that the modified or limited hydraulic pressures transmitted to the rear wheel cylinders under average conditions, reasonably closely follows an ideal pressure curve based on the weight transfer due to the hydraulic pressures in the wheel cylinders, and the consequent deceleration of the vehicle.

A further object is to provide in a mechanism of this character, means for correcting the modified or reduced rear wheel hydraulic pressure if the latter is not in proportion to the front wheel cylinder hydraulic pressures.

Other objects and advantages of the invention will become apparent during the course of the following description.

In the drawings I have shown one embodiment of the invention. In this showing:

FIGURE 1 is an axial sectional view through the compensating valve forming the principal subject matter of the present invention, the hydraulic pressure generating means, the wheel cylinders, and the connections therebetween being diagrammatically represented;

FIGURE 2 is an enlarged fragmentary sectional view through a portion of the compensating valve device; and FIGURE 3 is a graph indicating hydraulic braking pressures under different braking conditions.

Referring to FIGURE 1, the hydraulic pressure-generating means for the brake system is generally illustrated in the form of a conventional master cylinder 10, operable by a brake pedal 11 through a push rod 12. It will become apparent that the particular pressure generating means employed makes no difference so long as some such means is employed in the combination. For example, the pressure-generating means may be operated by a conventional booster motor or by a motor which generates all of the braking pressures without assistance by the brake pedal.

The outlet of the master cylinder is connected through suitable lines 14 to the front wheel brake cylinders 15. A branch line 16, connected to one of the lines 14, supplies fluid to a weight-compensating valve indicated as a whole by the numeral 17. From such valve device fluid is supplied through lines 19 to the rear wheel cylinders 20.

The valve 17 is provided with relatively larger and smaller connected bores 25 and 26, in the latter of which is arranged a piston 27 operable in sealed relation to the bore 26 as at 28. A preloaded spring 29 is arranged in a chamber 30 between the piston 27 and the adjacent end of the bore 26, such bore being vented to the atmosphere as at 31. The piston 27 is mounted on a stem 33 forming a part thereof and provided at the end opposite the spring 29 with a head 34 for a purpose to be described.

A plug 36 is arranged in the right-hand end of a third bore 37, which extends through the right-hand end of the valve body, the plug being fixed in position by snap ring 38. The plug 36 is provided with an extended coaxial sleeve portion 40 (FIGURE 2) provided with a port 41 communicating with a chamber 42 between the head 34 and plug 36, the latter being provided with lugs 43 to space the head 34 from the body of the plug 36.

The sleeve portion 40 of the plug 36 is spaced from the wall of the bore 37 to form a chamber 45 into which the port 41 opens. The chamber 45 communicates through ports 46 with the hydraulic lines 19.

The left-hand side of the head 34 is grooved as at 50, to receive an O-ring 51 which extends beyond the shoulder 52 at the left side of the groove 50, as seen in FIGURE 2. The portion of the O-ring 51 thus projecting from the groove 50 serves as a valve in a manner described below. The radially inner surface of the groove 50 is of smaller diameter than the inner diameter of the O-ring 51 to form a space 63. The right side of the O-ring may be spaced from the shoulder 50 and engageable therewith as a valve, as described below.

A second piston 55 slides in the bore 25 and is sealed with respect thereto as at 56. The space to the left of the seal 56 forms a chamber 57 communicating through port 58 with the hydraulic line 16. The piston 55 is provided with an annular shoulder 59 engageable under certain conditions with the adjacent end of the sleeve 40 of the plug 36. The left-hand end of the piston 55 normally seats against a shoulder 60 formed between the bores 25 and 26 to limit movement of the piston 55 to the left in FIGURE 1. A spring 61 arranged between the piston 55 and head 34 urges these elements away from each other to normally seat the piston 55 against the shoulder 60, and to seat the head 34 against the lugs 43.

The right-hand end of the piston 55 is adapted to enter the sleeve portion 40 in the plug 36, and is provided with clearance with respect thereto as more clearly shown in FIGURE 2, and indicated by the numeral 64. This clearance forms a passage to provide communication between the chamber 45 and a chamber 65 provided between the piston 55 and valve ring 51, and the chamber 65 communicates through a passage 66 with a chamber 67 in which the spring 61 is arranged, such chamber communicating with the chamber 57 through a port 68 in the piston 55. The O-ring 51 may be seated against the face of the piston 55. In such case the space between the O-ring 51 and shoulder 50 will connect the space 63 with a passage 60' between the head 34 and sleeve 40 until the O-ring 51 acting as a valve, engages shoulder 50.

As further described below, the displacement of fluid from the master cylinder results in equally applying the front and rear brakes up to a predetermined point, at which time the right-hand end of the piston 55 engages the valve ring 51. Beyond such point, the front-wheel brakes are applied proportionately to pressures in the master cylinder, while pressure increases on the rear-wheel cylinders occur at a substantially lower rate. In the diagram illustrated in FIGURE 3, the axis of abscissas indicates front wheel cylinder pressures, while the axis or ordinates indicates rear wheel cylinder pressures. When the brakes are released, pressures are at the zero point 70 in FIGURE 3, and upon operation of the brake pedal or any other pressure-generating means, pressure increases occur equally in the front and rear wheels on a 1:1 ratio as indicated by the line 71 up to the point 72 at which point the valve ring 51 closes. Beyond such point, the ratio between front and rear wheel cylinder pressures changes progressively as indicated by line 75. In an ideal brake operation, rear wheel versus front wheel hydraulic pressures would occur approximately as indicated by the line 74 in FIGURE 3, and the present mechanism approximates such ideal distribution. With the present device, rear wheel pressures increase in relation to front wheel cylinder pressure approximately as indicated by the line 75 and may vary within the limits indicated by the lines 76 and 77, these two lines indicating the maximum range of correction or error due to variations in the coefficient of friction or in brake effectiveness in accordance with brake fade, etc. With normal properly adjusted and functioning brakes, the rear wheel pressures will increase in relation to the front wheel cylinder pressure as indicated by the line 75; in any case, the rate of rear brake hydraulic pressure increases will be substantially less than the rate of front wheel brake pressure increases. The line 73 indicates the 1:1 hydraulic pressure ratio when no weight transfer compensating device is used. In FIGURE 3, the values $g$ indicate the retarding force in relation to vehicle weight, as $F/W$, where F is the retarding force at the road surface, and W is the weight of the vehicle. As an example, .5 g. would occur at approximately 16 ft. sec.$^2$ deceleration.

*Operation*

The parts of the compensating valve normally occupy the positions shown in FIGURES 1 and 2, that is, the positions they will occupy when the brake pedal is released. The brakes are applied in the present instance by depressing the pedal 11 to displace fluid from the master cylinder 10, through lines 14 and 16. The lines 14 directly supply hydraulic pressure to the front wheel cylinders.

Fluid supplied through the line 16 will flow through chamber 57, port 68, chamber 67, passage 66 (FIGURE 2), thence through chamber 65, passage 64, chamber 45 and lines 19 to the rear wheel cylinders 20. Approximately at the point 72 in FIGURE 3, pressure supplied to the rear wheel cylinders, present in the chamber 42, will act on the right-hand face of the head 34 to move the stem 33 and piston 27 to the left in FIGURE 1 against the loading of the spring 29 to engage the valve ring 51 with the adjacent end of the piston 55. Thus the passage 64 will be closed and no more hydraulic fluid will be supplied through the normal paths referred to above during the remainder of the brake operation, except as indicated below.

The volume of the chamber 42 will be increased by movement of the head 34 to the left to engage the valve ring 51 with the piston 55, or with the shoulder 50. This closing of the valve ring 51 occurs approximately at the point 72 in FIGURE 3, and thereafter an increase in pressure in the chamber 57, due to continued operation of the brake pedal, will move the pistons 27 and 55 as a unit to the right, thus displacing fluid from the expanded chamber 42 through port 41 to the rear brake cylinders. Thus rear brake pressures in relation to front brake pressures will be modified as indicated by the line 75 in FIGURE 3.

The valve ring 51 will have closed when rear wheel hydraulic pressure corresponds to about .3 or .4 g., or as may suit the particular vehicle. Since the rear wheel brakes have been set, the additional fluid requirement is very slight; therefore, very little travel of the pistons 27 and 55 is provided for. Above the point where the valve ring 51 closes, the rear wheel cylinder pressure, lower relative to front wheel cylinder pressure, is determined by the ratio of the cross-sectional area of the bore 25 to the annular area between the bores 25 and 26.

Should more fluid be required for some reason, the piston 55 would run out of stroke, the shoulder 59 stopping against the adjacent edge of the sleeve portion 40 of the plug 36. Slightly greater travel is permitted for the piston 27 and stem 33 after the piston 55 reaches its limit of movement referred to. Additional fluid can then be supplied since pressure in the chamber 67 will move the head 34 to slightly unseat the valve ring 51 to permit the flow of fluid from the chamber 67 through the passage 64 into the rear wheel cylinders. A somewhat greater reduction in the rate of increase in rear wheel cylinder pressure would be obtained since a greater pressure from the master cylinder would be required to open or crack the valve ring 51.

From the graph in FIGURE 3 it will be apparent that wheel cylinder pressures, both front and rear, increase uniformly as indicated by the line 71 up to the point 72, approximately at which point the valve ring 51 closes. Thereafter, with continued brake pedal operation, rear wheel pressures in relation to front wheel pressures will increase as indicated by the line 73. With a given ratio of pistons 25 and 27 and spring 29, the ratio between rear wheel cylinder pressures and front wheel cylinder pressures will gradually change, as indicated by the line 75 in FIGURE 3, such pressure ratio being reasonably close to the ideal pressure distribution indicated by the line 74. Due to variations in the coefficient of friction or brake effectiveness, as caused, for example by fade, distribution may vary between the maximum range indicated by the lines 76 and 77. The parts will be designed according to the particular vehicle on which the mechanism is to be used and the valve device 17 will function to limit braking at the rear wheels, rear wheel cylinder pressures increasing, but at a rate substantially lower than the rate of increase in the front wheel cylinders, thus minimizing the danger that the rear wheels will lock and slide. The valve device 17, while quite simple, therefore, functions importantly in securing close to the ideal distribution of braking forces, the device effectively compensating for vehicle weight transfer with respect to the rear wheels, occurring during a brake application.

It is to be understood that the form of the invention shown and described is to be taken as a preferred example of the same and that various changes in the shape, size and arrangement of the parts may be made as do not depart from the spirit of the invention or the scope of the appended claims.

I claim:

1. A compensating valve device having an inlet communicating with a variable pressure hydraulic fluid pressure source and outlet means communicating with a fluid operable device, inner and outer pressure responsive elements, forming a passage communicating with said inlet, said inner element having one end surface exposed to a biasing force, said valve device having a chamber communicating with said passage and with said outlet means and to which chamber the other end surface of said inner element is constantly exposed, whereby said inner element is moved in one direction when pressure in said chamber increases to a predetermined point relative to pressure in said inlet and engages in sealed relation with said outer element to prevent flow of fluid through said passage to said outlet means, said elements both having pressure surfaces subject to pressures in said inlet so as to be movable as a unit in the other direction by an increase in inlet pressure to displace fluid from said chamber through said outlet means.

2. A valve device according to claim 1 having means for limiting movement of said outer element in said other direction, said pressure surface of said inner element subject to inlet pressure causing movement of said inner element in said other direction if pressure in said inlet increases after movement of said outer element is stopped, to reopen said passage to said chamber.

3. A compensating valve device having an inlet communicating with a variable pressure hydraulic fluid line and outlet means communicating with a fluid operable device, said valve device having internal bores, inner and outer pressure responsive elements slidable in said bores, an inlet chamber outwardly of said outer pressure responsive element communicating with said forward fluid line end, an outlet fluid chamber in said casing communicating with said outlet means, said pressure responsive elements having normal positions in which they define a passage between said inlet and outlet chambers, said casing having a pressure chamber communicating with said outlet chamber and to which one end of said inner pressure responsive element is constantly exposed, the other end of said inner pressure responsive element being exposed to a biasing force, pressure in said pressure chamber, when the latter reaches a predetermined point, relative to pressure in said inlet chamber, moving said inner pressure responsive element in one direction into engagement with said outer pressure responsive element to close said passage, said elements both having pressure surfaces exposed to pressure in said inlet chamber whereby a pressure increase in said inlet chamber, after said inner element has engaged said outer element, moves said pressure responsive elements in the other direction as a unit to displace fluid from said pressure chamber into said outlet chamber.

4. A valve device according to claim 3 wherein one of said pressure responsive elements carries a resilient valve element engageable with the other pressure responsive element when said inner responsive element moves in said one direction whereby said valve element closes said passage.

5. A valve device according to claim 3 wherein said inner pressure responsive element has a limit of movement in said other direction relative to said casing, said outer pressure responsive element having a limit of movement in said one direction relative to said casing, said biasing force consisting of a spring biasing said inner element to said limit of movement, the loading of said spring predetermining the pressure in said pressure chamber at which said inner pressure responsive element will move in said one direction to close said passage.

6. A valve device according to claim 3 provided with means for limiting movement of said outer pressure responsive element in said other direction whereby, upon a still further increase in pressure in said inlet chamber, such pressure will move said inner pressure responsive element in said other direction to reopen said passage.

7. A compensating valve device comprising a casing having a smaller bore in one end and a larger bore in axial alignment therewith, an inner piston slidable in said smaller bore and having a stem portion extending toward the other end of said casing and provided with a head defining with said other end of said casing a pressure chamber, a second coaxial piston surrounding said stem and slidable in said larger bore, said second piston formed with one end of said largtr bore an inlet chamber communicating with a pressure generating means, said casing having an outlet chamber communicating with said pressure chamber and with a pressure operable device, said pistons having normal positions in which they form a passage between said inlet and said outlet chambers, said stem being slidable in said second piston, and a spring engaging said inner piston to bias said head towards said pressure chamber whereby, when pressure in said chamber increases to a predetermined point, said spring will be overcome and said head will move into engagement with said outer piston to close said passage.

8. A valve device according to claim 7 wherein said outer piston is in sealed sliding engagement with said larger bore so that said outer piston is subject to pressure in said inlet chamber, such pressure, when it rises after said passage is closed, moving said pistons as a unit to displace fluid from said pressure chamber to said outlet chamber.

9. A valve device according to claim 7 wherein said outer piston is in sealed sliding engagement with said larger bore so that said outer piston is subject to pressure in said inlet chamber, such pressure, when it rises after said passage is closed, moving said pistons as a unit to displace fluid from said pressure chamber to said outlet chamber, and means for limiting movement of said second piston in said other direction whereby, upon a further increase in pressure in said inlet chamber, such pressure will move the inner piston in said other direction to open said passage.

References Cited by the Examiner

UNITED STATES PATENTS

| 2,920,451 | 1/1960 | Milster | 60—54.5 |
| 2,991,797 | 7/1961 | Baldwin | 303—6 |
| 3,088,285 | 5/1963 | Giacosa et al. | 60—54.6 |

EUGENE G. BOTZ, *Primary Examiner.*

ARTHUR L. LA POINT, *Examiner.*